/

US010740980B2

(12) United States Patent
Frank et al.

(10) Patent No.: US 10,740,980 B2
(45) Date of Patent: Aug. 11, 2020

(54) SYSTEM AND METHOD OF GENERATING VIRTUAL REALITY DATA FROM A THREE-DIMENSIONAL POINT CLOUD

(71) Applicant: FARO Technologies, Inc., Lake Mary, FL (US)

(72) Inventors: Aleksej Frank, Kornwestheim (DE); Oliver Zweigle, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/545,612

(22) Filed: Aug. 20, 2019

(65) Prior Publication Data
US 2020/0005546 A1 Jan. 2, 2020

Related U.S. Application Data

(63) Continuation of application No. 15/886,969, filed on Feb. 2, 2018.
(Continued)

(51) Int. Cl.
*G06T 19/00* (2011.01)
*G06T 17/00* (2006.01)
(Continued)

(52) U.S. Cl.
CPC .......... *G06T 19/006* (2013.01); *G06Q 20/00* (2013.01); *G06T 17/00* (2013.01); *G06T 19/00* (2013.01); *G06T 19/003* (2013.01); *G06Q 20/14* (2013.01); *G06T 2210/56* (2013.01); *G06T 2210/61* (2013.01); *G06T 2219/004* (2013.01)

(58) Field of Classification Search
None
See application file for complete search history.

(56) References Cited

U.S. PATENT DOCUMENTS 7,327,446 B2  2/2008  Cramer et al.
8,683,709 B2  4/2014  York
(Continued)

OTHER PUBLICATIONS

Mortimer, Michael et al.: "Kinect with ROS, interact with Oculus: Towards Dynamic User Interfaces for Robotic Teleoperation", 2016 11th System of Systems Engineering Conference (SOSE), IEEE, Jun. 12, 2016 (Jun. 12, 2016), pp. 1-6, XP032945151.
(Continued)

*Primary Examiner* — Said Broome
(74) *Attorney, Agent, or Firm* — Cantor Colburn LLP

(57) ABSTRACT

A system and method for generating a virtual reality scene from scanned point cloud data having user defined content is provided. The system includes a coordinate measurement device operable to measure three-dimensional coordinates. A computing device having a processor is operably coupled to the coordinate measurement device, the processor being operable to generate a point cloud data and insert user defined content into the point cloud data in response to an input from a user, the processor further being operable to generate a virtual reality data file based at least in part on the point cloud data with the user defined content. A virtual reality device is operably coupled to the computing device, the virtual reality device being operable to display the virtual reality data file to the user.

11 Claims, 12 Drawing Sheets

Related U.S. Application Data

(60) Provisional application No. 62/459,247, filed on Feb. 15, 2017.

(51) Int. Cl.
*G06Q 20/00* (2012.01)
*G06Q 20/14* (2012.01)

(56) References Cited

U.S. PATENT DOCUMENTS

| | | |
|---|---|---|
| 9,088,787 B1 * | 7/2015 | Smith .................. G06T 19/006 |
| 9,482,746 B2 | 11/2016 | Bridges |
| 9,506,744 B2 | 11/2016 | Bridges |
| 2010/0245344 A1 | 9/2010 | Chen et al. |
| 2014/0294257 A1 | 10/2014 | Tussy |
| 2016/0180602 A1 * | 6/2016 | Fuchs .................... G06F 3/012 463/31 |
| 2016/0220105 A1 * | 8/2016 | Duret .................... A61B 6/022 |
| 2018/0232954 A1 | 8/2018 | Frank |

OTHER PUBLICATIONS

Tan Qu and Wei Sun: "Usage of 3D Point Cloud Data in BIM: Current Applications and Challenges", J. of Civil Eng and Arch, No. 9 2015, Retrieved Internet on Apr. 13, 2018: URL:HTTP://www.davidpublisher.org/Public/uploads/Contribute/566e61cab6b4.pdf—10 pages.

* cited by examiner

SYSTEM AND METHOD OF GENERATING VIRTUAL REALITY DATA FROM A THREE-DIMENSIONAL POINT CLOUD

CROSS REFERENCE TO RELATED APPLICATIONS

This application claims the benefit of U.S. Non-Provisional application Ser. No. 15/886,969, filed Feb. 2, 2018, and of U.S. Provisional Application Ser. No. 62/459,247, filed Feb. 15, 2017, the entire disclosures of which are incorporated herein by reference.

BACKGROUND

The present disclosure relates to a system and method of generating a data file from a point cloud for use in a virtual reality system, and in particular to a system and method of annotating a point cloud with user defined content Three-dimensional point cloud data may be generated using a three-dimensional (3D) coordinate measurement instrument. A 3D coordinate measurement instruments include, but are not limited to: a laser scanner time-of-flight (TOF) device, a triangulation scanner device, a laser tracker and an articulated arm coordinate measurement machine.

A 3D laser scanner TOF device steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner. A 3D image of a scene may require multiple scans from different registration positions. The overlapping scans are registered in a joint coordinate system. Such registration is performed by matching targets in overlapping regions of the multiple scans. The targets may be artificial targets such as spheres or checkerboards or they may be natural features such as corners or edges of walls.

The collection of 3D coordinate data is typically referred to as a point cloud since the coordinates are graphically represented as individual points on surfaces when displayed on a two-dimensional (2D) display, such as a computer monitor. It should be appreciated that it may be difficult to visualize a 3D image of the scene on a 2D display based on the point cloud. To compensate for this methods have been developed to represent surfaces based on the point cloud to create a more realistic visualization. However, the scene is still being represented on a 2D display, which interferes with the user's ability to immerse themselves in the representation of the scanned scene.

Accordingly, while point cloud display systems are suitable for their intended purposes, there is a need for apparatus and methods that allow a user to visualize point cloud data and user defined data in a virtual environment according to certain features of embodiments of the present invention.

BRIEF DESCRIPTION

According to an aspect of the invention, a system for generating a virtual reality scene to a user. The system including a service provider computer having a network connection. A service provider storage is accessible by the service provider computer. Software is executed on the service provider computer providing an interface allowing a subscriber to log in to said service provider computer. The software generates a virtual reality data file that includes user defined content inserted into the point cloud data by the subscriber to the subscriber. Wherein the generating of the virtual reality data file comprises: receiving from the subscriber a point cloud data; generating virtual reality data by converting the point cloud data to a virtually reality device compatible format, the virtual reality data including the user defined content; and generating an executable virtual reality data file from the virtual reality data; the software allowing the subscriber to set access to the virtual reality data file by a user via the interface; the software executing on the service provider computer providing the interface allowing the user to log in to the service provider computer, wherein the software identifies the user and presents the virtual reality data file to the user.

According to another aspect of the invention, a method of viewing point cloud data with user defined content in a virtual reality device is provided. The method includes measuring three-dimensional coordinate data by scanning an environment using a coordinate measurement device. A point cloud data is generated based at least in part on the three-dimensional coordinate data. A user defined content is selected. An area in the point cloud data is selected for the user defined content. The user defined content is inserted into the area of the point cloud data. A virtual reality data file is generated from the point cloud data with the user defined content. The virtual reality data file is transmitted to the virtual reality device.

According to another aspect of the invention, a system for viewing point cloud data with user defined content is provided. The system includes a coordinate measurement device operable to measure three-dimensional coordinates. A computing device having a processor is operably coupled to the coordinate measurement device, the processor being operable to generate a point cloud data and insert user defined content into the point cloud data in response to an input from a user, the processor further being operable to generate a virtual reality data file based at least in part on the point cloud data with the user defined content. A virtual reality device is operably coupled to the computing device, the virtual reality device being operable to display the virtual reality data file to the user.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments provide advantages in displaying point cloud data that includes user defined data in a virtual reality device.

It should be appreciated that while embodiments herein discusses a coordinate measurement device with respect to a laser scanner, such as a time-of-flight laser scanner device, the claimed invention should not be so limited. In other embodiments, the coordinate measurement device may be any device capable of generating a point cloud representing the three-dimensional coordinates of points on surfaces of the scanned environment. Coordinate measurement devices may include, but are not limited to: time-of-flight laser scanners, laser trackers, triangulation scanners, articulated arm coordinate measurement machines, total stations and theodolites. In some embodiments, the point cloud data described herein may be generated using three-dimensional coordinate data from a plurality of coordinate measurement devices.

An example of a laser tracker coordinate measurement device includes commonly owned U.S. Pat. No. 7,327,446 entitled "Self-Compensating Laser Tracker" and U.S. Pat. No. 9,482,746 entitled "Six-Degree-of-Freedom Laser Tracker That Cooperates With A Remote Sensor," the contents of which are incorporated by reference herein. An example of a triangulation scanner includes commonly owned U.S. Pat. No. 9,506,744 entitled "Triangulation Scanner And Camera For Augmented Reality," the contents of which are incorporated by reference herein. An examiner of an articulated arm coordinate measurement machine includes commonly owned U.S. Pat. No. 8,683,709 entitled "Portable Articulated Arm Coordinate Measuring Machine with Multi-Bus Arm Technology." the contents of which are incorporated by reference herein.

Figure 1:
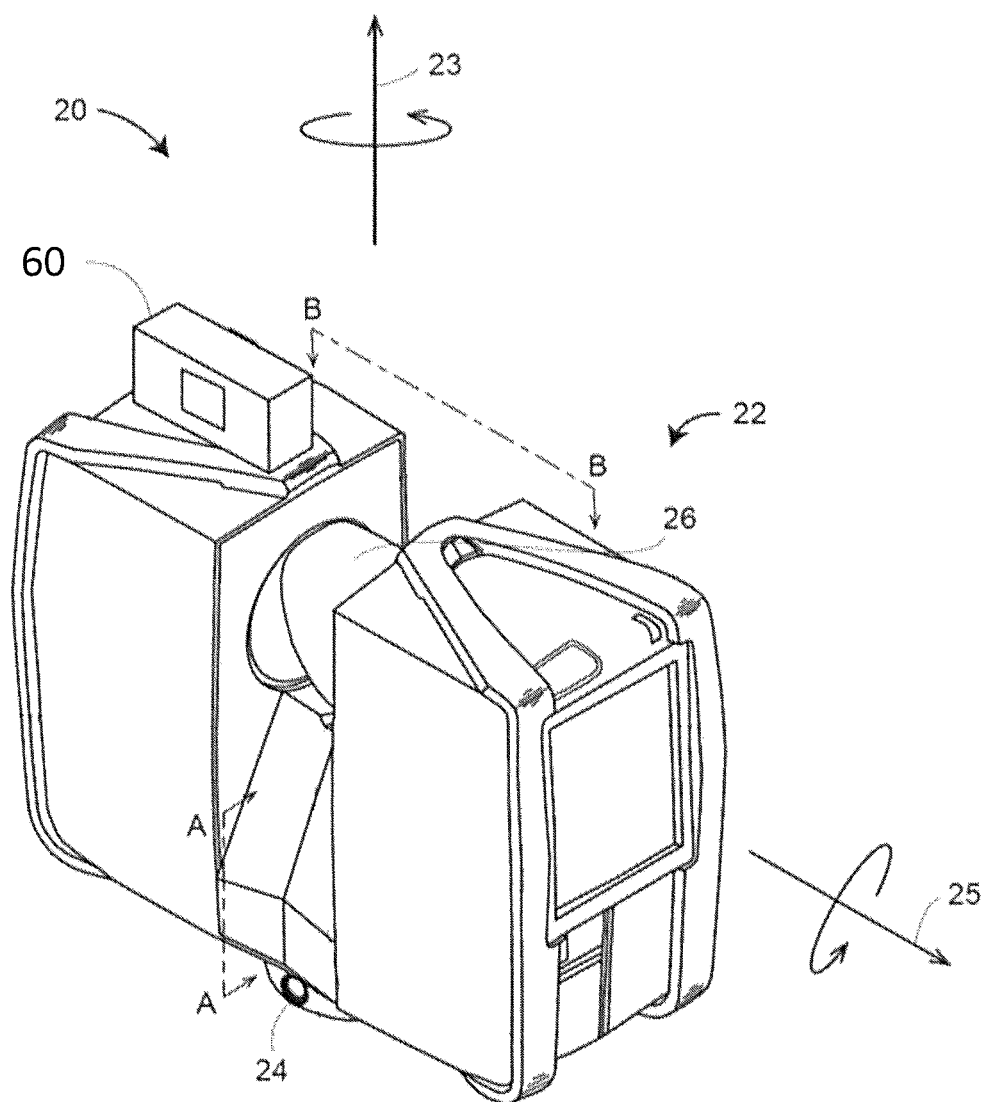
FIG. 1 illustrates a perspective view of a laser scanner in accordance with an embodiment of the invention.
Figure 2:
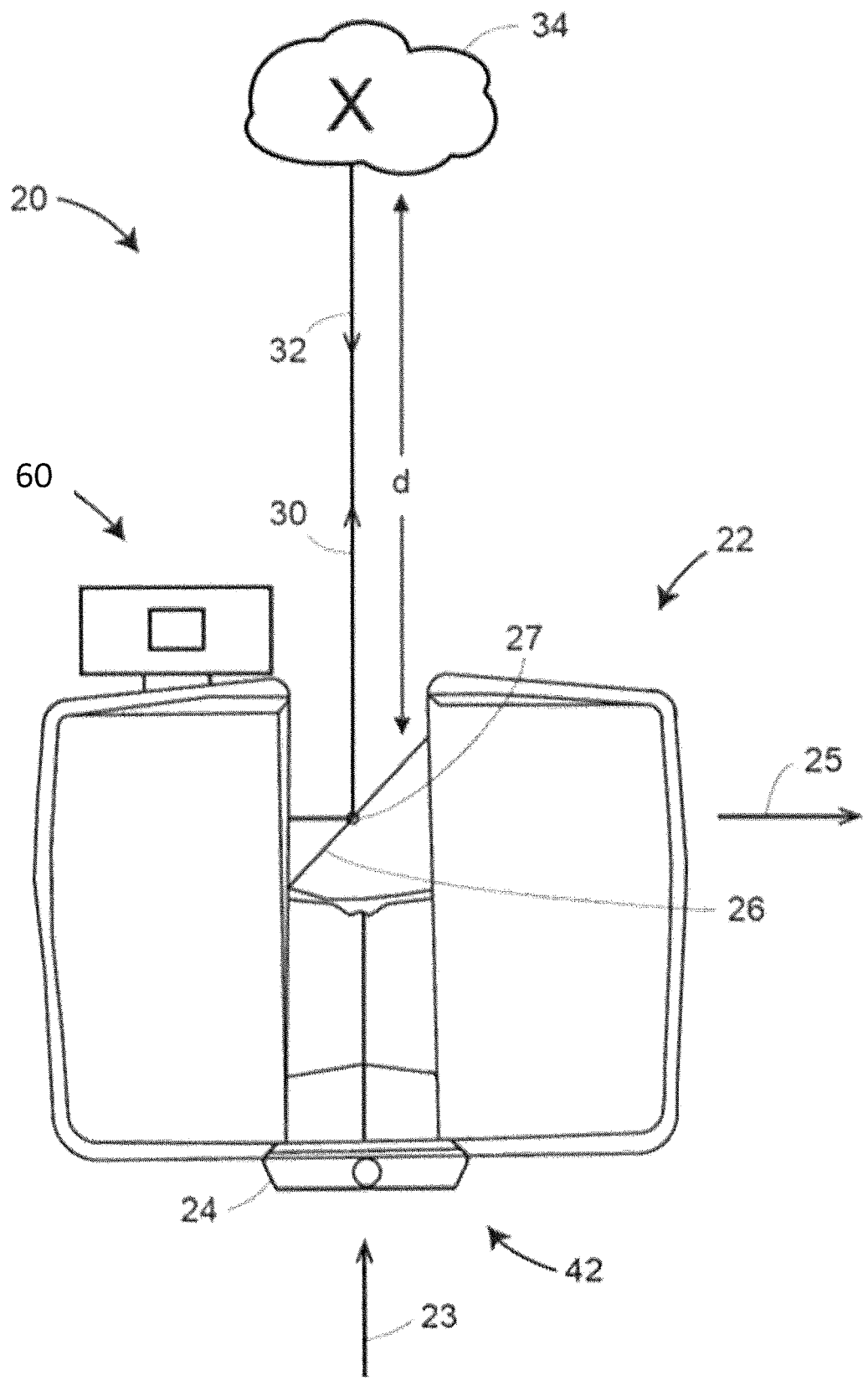
FIG. 2 illustrates a side view of the laser scanner illustrating a method of measurement.
Figure 3:
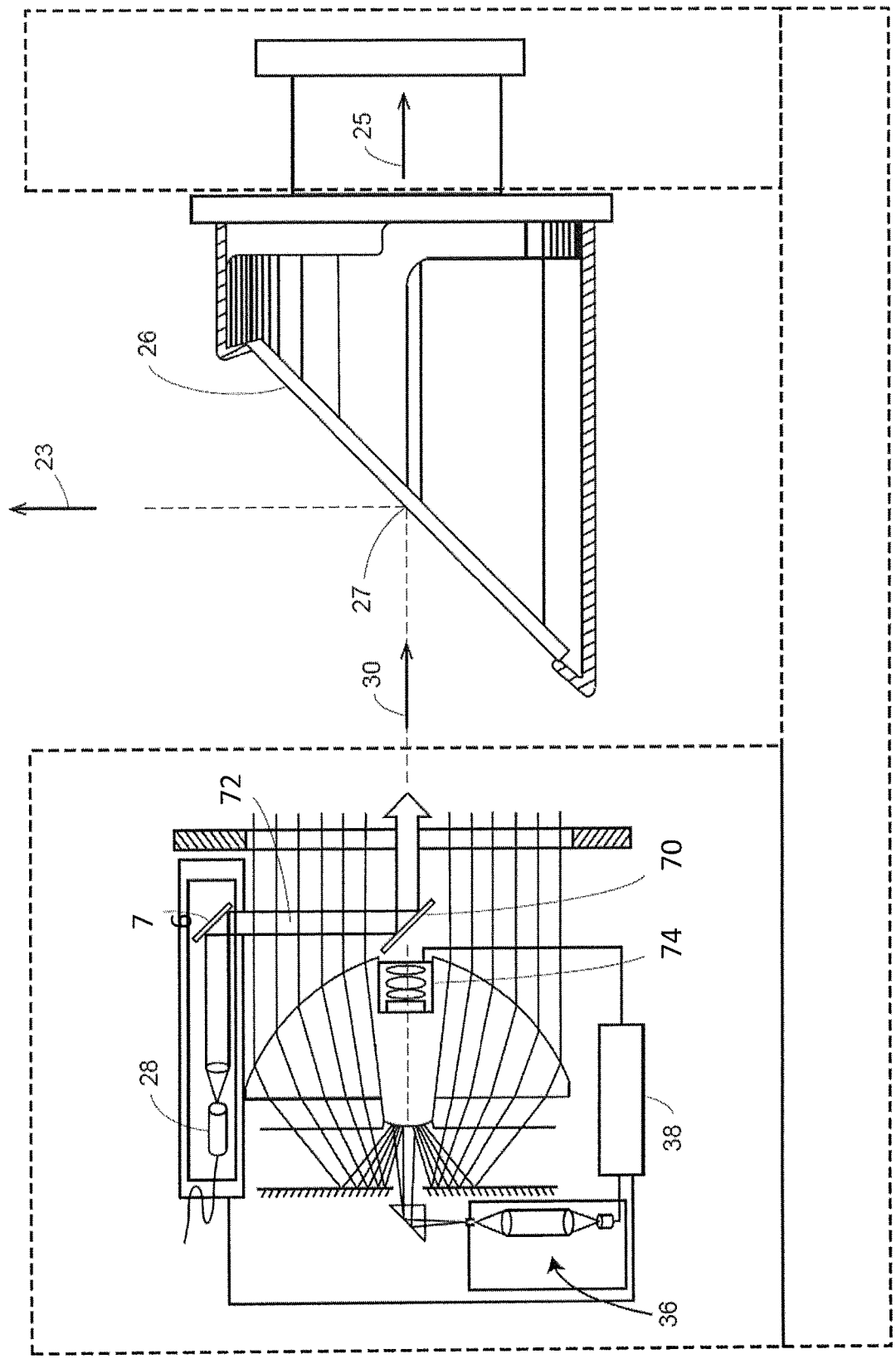
FIG. 3 illustrates a schematic view of the optical, mechanical, and electrical components of the laser scanner.

Referring now to FIGS. 1-3, an exemplary coordinate measurement device, such as laser scanner 20 for example, is shown for optically scanning and measuring the environment. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nanometers, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto the rotary mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 about axis 25 relatively quickly while rotating the measuring head 22 about axis 23 relatively slowly, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

In an embodiment, the base 24 is coupled to a swivel assembly (not shown) housed within the carrying structure 42. It includes a motor configured to rotate the measuring head 22 about the axis 23.

An auxiliary image acquisition device 60 may be a device that captures images or measures a parameter associated with the scanned volume or the scanned object and provides a signal representing the measured quantities over an image acquisition area. The auxiliary image acquisition device 60 may be, but is not limited to, a two-dimensional camera, a pyrometer, a thermal imager, an ionizing radiation detector, or a millimeter-wave detector.

In an embodiment, a camera (first image acquisition device) 74 is located internally to the scanner and may have the same optical axis as the 3D scanner device. In this embodiment, the first image acquisition device 74 is integrated into the measuring head 22 and arranged to acquire images along the same optical pathway as emitted light beam 30 and reflected light beam 32. In this embodiment, the light from the light emitter 28 reflects off a fixed mirror 76 and travels to dichroic beam-splitter 70 that reflects the light 72 from the light emitter 28 onto the rotary mirror 26. The dichroic beam-splitter 70 allows light to pass through at wavelengths different than the wavelength of light 72. For example, the light emitter 28 may be a near infrared laser light (for example, light at wavelengths of 780 nm or 1150 nm), with the dichroic beam-splitter 70 configured to reflect the infrared laser light while allowing visible light (e.g., wavelengths of 400 to 700 nm) to transmit through. In other embodiments, the determination of whether the light passes through the beam-splitter 70 or is reflected depends on the polarization of the light. The digital camera 74 takes 2D photographic images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
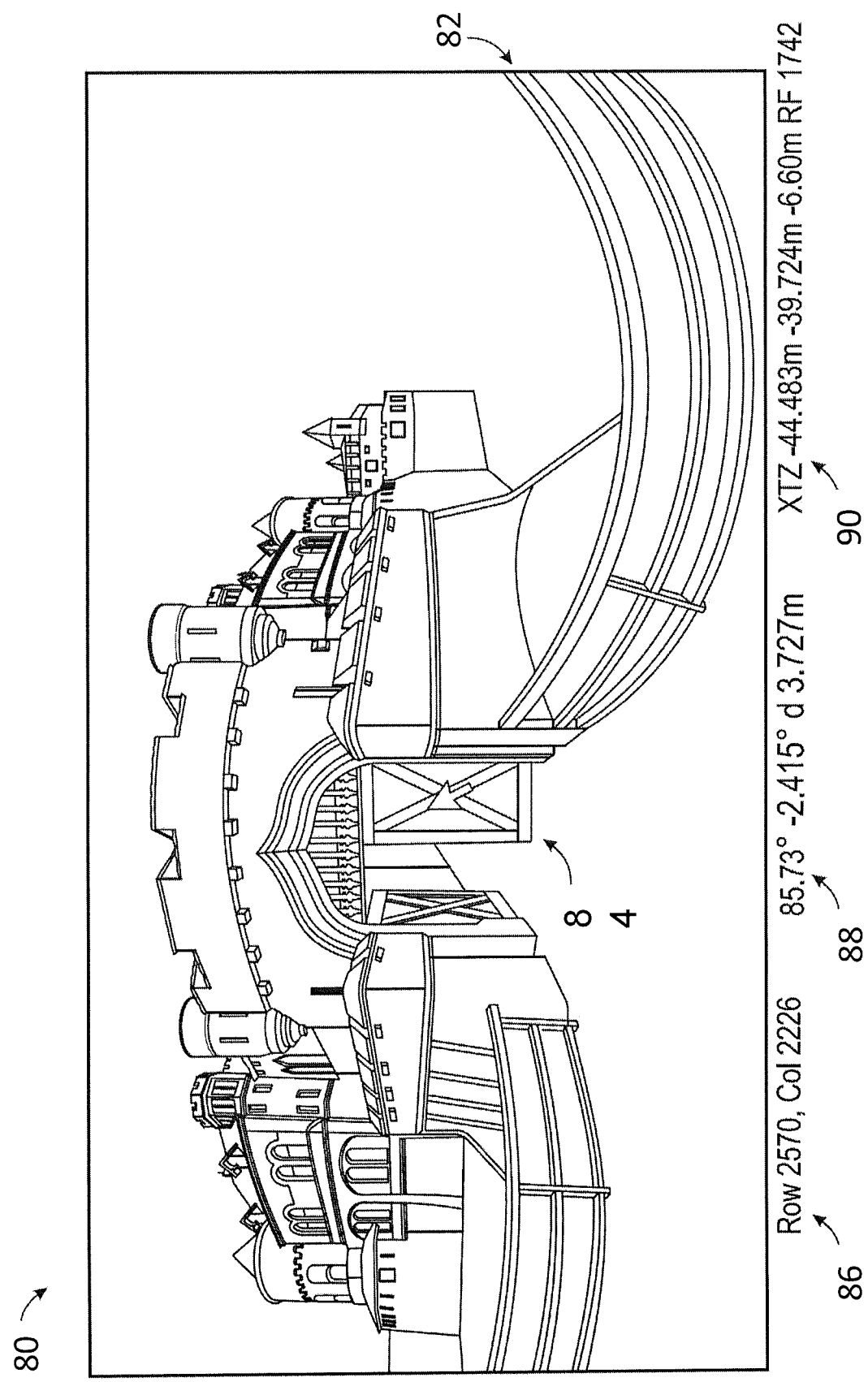
FIG. 4 illustrates a 2D planar view of a 3D scanned image.

Referring now to FIG. 4, an example of a two-dimensional (2D) planar view is shown of a 3D scanned image 80. The planar view depicted in FIG. 4 maps an image based on direct mapping of data collected by the scanner. The scanner collects data in a spherical pattern but with data points collected near the poles more tightly compressed than those collected nearer the horizon. In other words, each point collected near a pole represents a smaller solid angle than does each point collected nearer the horizon. Since data from the scanner may be directly represented in rows and column, data in a planar image is conveniently presented in a rectilinear format, as shown in FIG. 4. With planar mapping described above, straight lines appear to be curved, as for example the straight fence railings 82 that appear curved in the planar view of the 3D image. The planar view may be a 3D unprocessed scanned image displaying just the gray-scale values received from the distance sensor arranged in columns and rows as they were recorded. In addition, the 3D unprocessed scanned image of the planar view may be in full resolution or reduced resolution depending on system characteristics (e.g., display device, storage, processor). The 2D planar view may be a 3D processed scanned image that depicts either gray-scale values (resulting from the light irradiance measured by the distance sensor for each pixel) or color values (resulting from camera images which have been mapped onto the scan). Although the planar view extracted from the 3D scanner is ordinarily a gray-scale or color image, FIG. 4 is shown as a line drawing for clarity in document reproduction. The user interface associated with the display unit, which may be integral to the laser scanner, may provide a point selection mechanism, which in FIG. 4 is the cursor 84. The point selection mechanism may be used to reveal dimensional information about the volume of space being measured by the laser scanner. In FIG. 4, the row and column at the location of the cursor are indicated on the display at 86. The two measured angles and one measured distance (the 3D coordinates in a spherical coordinate system) at the cursor location are indicated on the display at 88. Cartesian XYZ coordinate representations of the cursor location are indicated on the display at 90.

In other embodiments, the 3D scanned image may be generated by mapping a planar view onto a sphere, or in some cases a cylinder. A panoramic view can be a 3D processed scanned image in which 3D information (e.g., 3D coordinates) is available. The panoramic view may be in full resolution or reduced resolution depending on system characteristics. It should be appreciated that even with the panoramic view, the image is still a 2D image that represents a 3D scene when viewed from a particular perspective. In this sense, a panoramic view is much like an image that might be captured by a 2D camera or a human eye.

The term panoramic view refers to a display in which angular movement is generally possible about a point in space, but translational movement is not possible (for a single panoramic image). In contrast, the term 3D view as used herein refers to generally refers to a display in which provision is made (through user controls) to enable not only rotation about a fixed point but also translational movement from point to point in space.

Figure 5C:
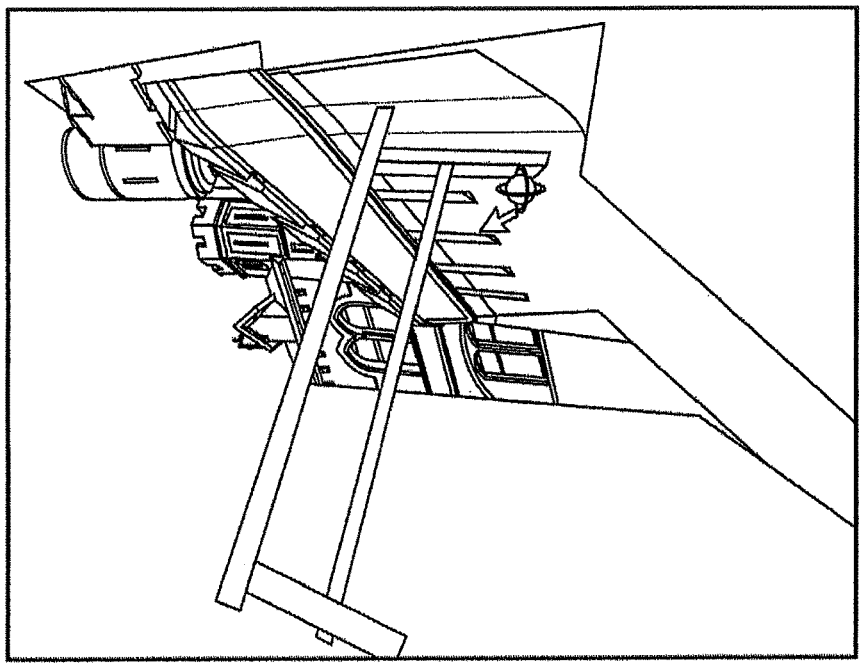
FIG. 5A, FIG. 5B and FIG. 5C illustrates embodiments of a 3D view of a 3D scanned image.
Figure 5B:
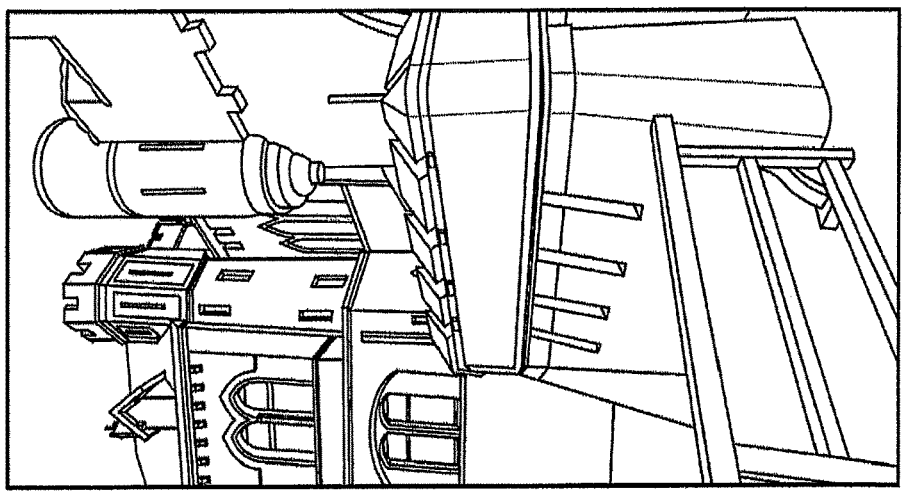
Figure 5A:
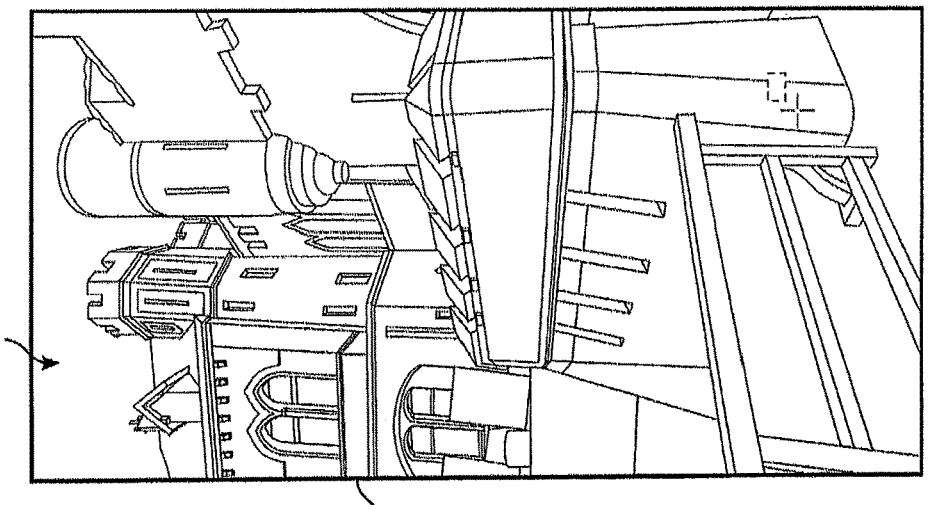

Referring now to FIGS. 5A, 5B and 5C, an example is shown of a 3D view 92 of a 3D scanned image. In the 3D view a user can leave the origin of the scan (e.g. the location that the laser scanner was located when the scan was performed) and view the scan data points from different viewpoints and angles. The 3D view is an example of a 3D processed scanned image. The 3D view may be in full resolution or reduced resolution depending on system characteristics. In addition, the 3D view allows multiple registered scans to be displayed in one view. FIG. 5A is a 3D view 94 over which a selection mask 96 has been placed by a user. FIG. 5B is a 3D view 98 in which only that part of the 3D view 94 covered by the selection mask 96 has been retained. FIG. 5C shows the same 3D measurement data as in FIG. 5B except as rotated to obtain a different view. Although the 3D views extracted from the 3D scanner are ordinarily a grayscale or color image, FIGS. 5A-C are shown as line drawings for clarity in document reproduction.

Figure 6:
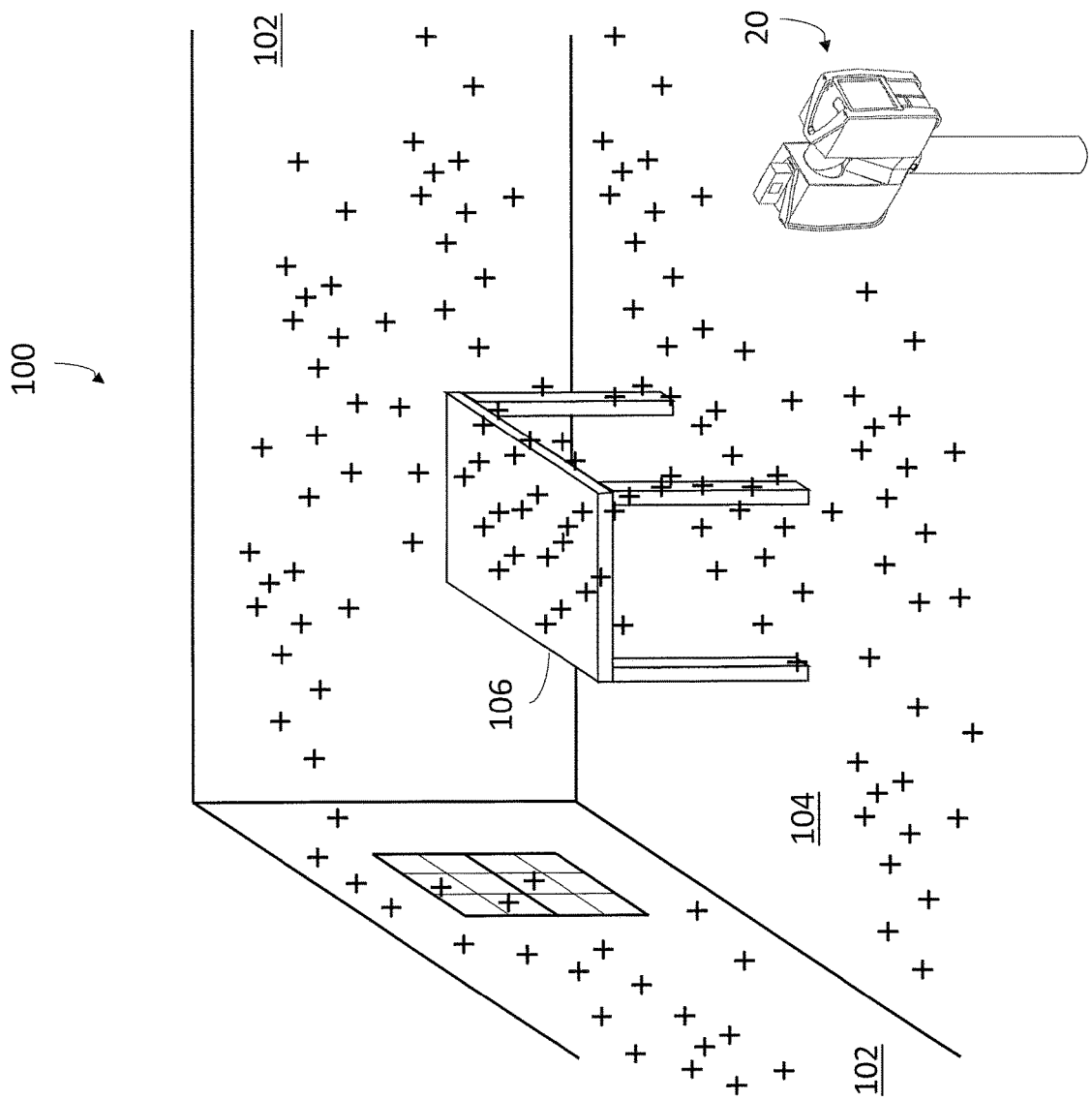
FIG. 6 illustrates an environment being scanned with a coordinate measurement device in accordance with an embodiment.

Referring now to FIG. 6, an embodiment is shown of an environment 100 that has been scanned by laser scanner 20. It should be appreciated that while the environment 100 is illustrated as being an interior of a building, this is for exemplary purposes and claimed invention should not be so limited. In other embodiments, the environment may be an external to a building for example. The environment 100 includes a plurality of surfaces, such as walls 102, a floor 104 and a table 106. During the scanning process, the laser scanner 20 emits light and receives reflected light from the plurality of surfaces. In some circumstances, the reflected light may be used to determine a distance from the gimbal point or origin 27 (FIG. 2) of the laser scanner 20 to the spot on the surface where the light reflected. Thus, the 3D coordinates of the point on the surface may be determined. In the illustration of FIG. 6, the points where measurements were made are represented by a "+" symbol. It should be appreciated that this is for clarity of illustration and that the locations where measurements are made would not be visible. Further, during an actual scan, the number of points It should be appreciated that in some embodiments the scanner 20 may be moved within the environment to enable measurement of points on surfaces that are not visible from the point of view of the laser scanner 20 at the location illustrated in FIG. 6. The measured points from the multiple scans may be combined through a registration process as is known in the art. The combined scan data then forms a point cloud of the environment 100. In some embodiments, the point cloud further includes color information, sometimes referred to as texture, which is acquired via a color camera, such as camera 74 for example.

With the point cloud data acquired, the user may desire to view the data. As discussed in reference to FIGS. 5A-5C, the 3D point cloud may be viewed on a two-dimensional display screen, such as display, a display on the coordinate measurement device, or a computer monitor on a separate computer. While this allows the user to view the data, it is limited by the two-dimensional nature of the computer screen. It may be desired to view the data using a virtual reality device instead. As used herein, a virtual reality device is a display device that allows the operator to electronically move in three dimensional space by operating the display to show the user a view based on the position/movement of the user. Virtual reality devices are commercially available, such as the RIFT manufactured by Oculus VR, LLC, the VIVE manufactured by HTC Corporation, or the GEAR VR manufactured by Samsung Electronics Co., Ltd.

In some embodiments, the operator may desire to incorporate other elements into the point cloud data to provide additional information to the user of a virtual reality device. For example, the operator may desire to include elements such as but not limited to: text, hyperlinks, meshes or computer aided design (CAD) data, two dimensional videos, 360° videos, or audio sounds. As discussed in more detail herein, in some embodiment these elements are integrated into the point cloud in a predetermined location by the operator and the virtual reality data file is transmitted to the user as an installable binary executable format. The executable file includes a viewer program and datasets that allow the virtual reality device to display the point cloud plus elements.

Figure 7:
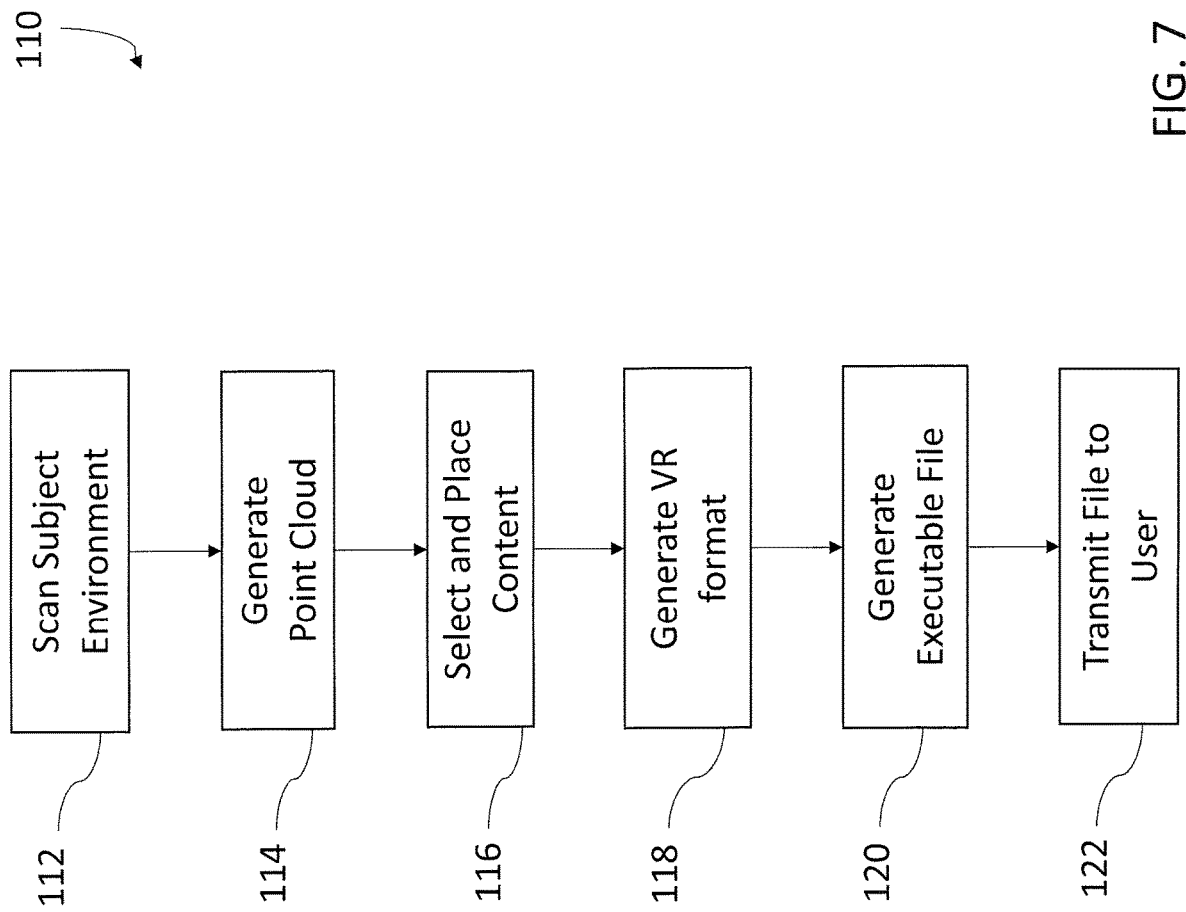
FIG. 7 illustrates a flow diagram of a method of generating a virtual reality data file from a point cloud in accordance with an embodiment.

Referring now to FIG. 7, a method 110 of preparing the virtual reality data file is shown that allows the user to place content within a point cloud and is usable with a virtual reality device. The method starts in block 112, where the environment, such as environment 100 for example, is scanned with a coordinate measurement device. The coordinate measurement device may be the laser scanner 20 for example. It should be appreciated that the coordinate measurement device may also include, but is not limited to time-of-flight laser scanners, laser trackers, triangulation scanners, articulated arm coordinate measurement machines, total stations, theodolites, or a combination of the foregoing. By scanning the environment, three-dimensional coordinate data of points on the surfaces of the environment. In an embodiment, the coordinate measurement machine also acquires color or gray-scale information that provides color or texture information that is associated with the measured points. In an embodiment, the scanning step 112 may be carried out multiple times with the coordinate measurement device being moved to allow coordinate data of different areas (such as areas not visible from the point of view of an initial scan location) to be acquired.

Once the environment is scanned, the method 110 proceeds to block 114 where the point cloud is generated. In an embodiment, where the three-dimensional coordinate data is acquired by multiple devices, or multiple scans are performed, this step may include a registration step that orients and places the separately acquired coordinate data in three-dimensional space in the same frame of reference as is known in the art.

With the point cloud generated, the method 110 may then proceed to block 116 where user-defined content is placed within the point cloud. This user-defined content may include, but is not limited to: text and hyperlinks (i.e. text format), mesh or CAD data (i.e. stl, obj, dae, or STEP format), two-dimensional videos (i.e. mp4 format), 360° videos (i.e. mp4 format), audio sounds (i.e. wav, mp3 or ogg format), or a combination of the foregoing.

Figure 8:
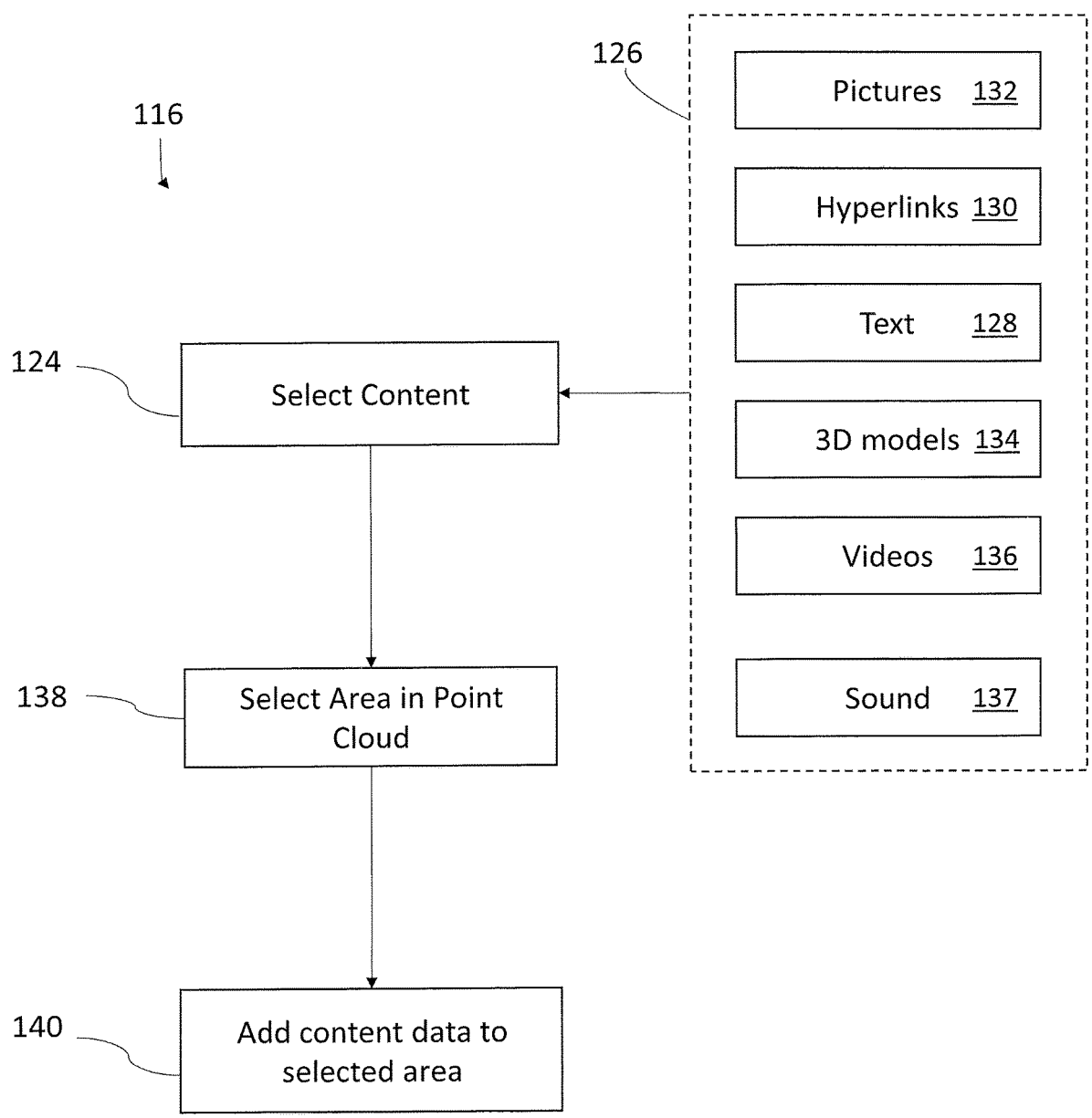
FIG. 8 illustrates a flow diagram for incorporating user defined or selected content to a point cloud.
Figure 9:
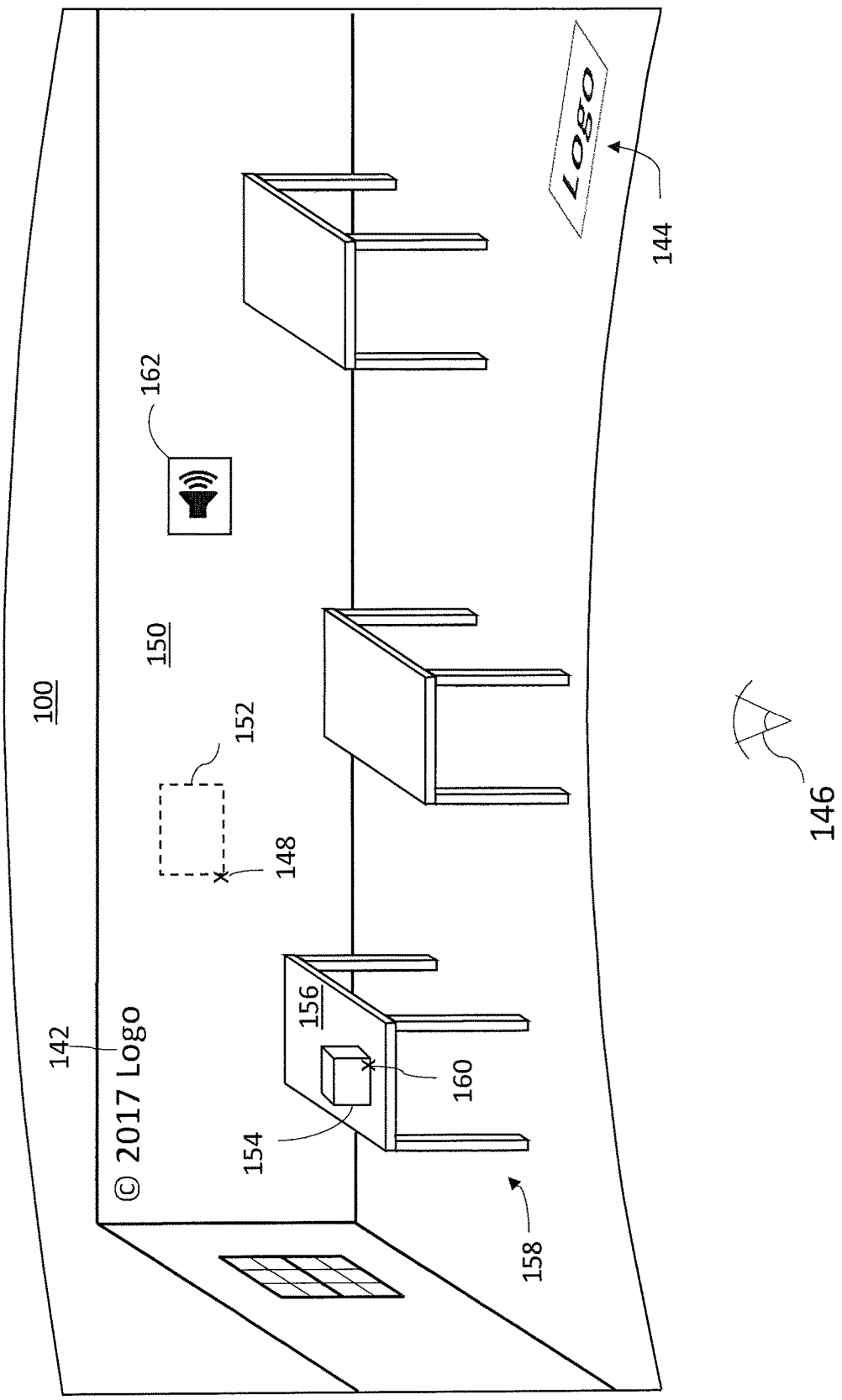
FIG. 9 illustrates a scene in a virtual reality environment in accordance with an embodiment.

Referring to FIG. 8 and FIG. 9, in one embodiment the step 116 of placing or selecting user-defined content includes selecting in block 124 content from a plurality of content types 126. The content types include textual content 128, hyperlinks 130, two dimensional images 132, three-dimensional models 134, video or animation media 136, and sound media 137. As used herein, a hyperlink is a textual content that provides a computer address that is user selectable.

For each desired content type, the operator selects in block 138 the area in the point cloud where the content will be located. For the text and hyperlink content is associated or attached to a point within the point cloud. In an embodiment, the text and hyperlink content 128, 130 is always pointed towards the user point of view 146 so that it is readable by the user when using the virtual reality device. For example, the operator may wish to place a copyright statement 142 within the point cloud environment 100. In an embodiment, the text and hyperlink content 128, 130 may be incorporated into the point cloud as texture data.

In an embodiment, the two-dimensional images may be a graphical image, such as logo 144 for example. The two-dimensional image is attached or associated with one or more points on a surface within the point cloud such that the image is viewable from the user point of view 146. For example, the operator may select a point 148 on surface 150 within the point cloud and associate a two-dimensional image 152 with that location. In an embodiment, a normal vector for the surface is determined and the image 152 is aligned and oriented such that image is viewable from a viewpoint facing the normal vector.

In an embodiment, the three-dimensional model (i.e. mesh or CAD data) content 134 has a three-dimensional attribute. Therefore, its size is known within three-dimensional space. In an embodiment, the three-dimensional model is registered to the same coordinate system frame of reference as the point cloud data. The three-dimensional model may then be placed within the point cloud data at a desired location. For example, the operator may desire to place a model 154 on a surface 156 of a table 158 within the point cloud. To do so, the operator may select one or more points 160 in the point cloud on surface 156 and a corresponding point (such as a vertex or corner) on the model and align the selected point 160 with the selected model feature to place the model in the point cloud.

In an embodiment, video content 136 may include two-dimensional video content and 360° video content. In an embodiment, the two-dimensional video content is similar to textual content in that it may be attached to a point or points and is oriented towards the user point of view 146. In another embodiment, the two-dimensional video has an orientation that is fixed. A fixed orientation may be advantageous when an operator wants to place the two-dimensional video on an object, such as a television screen for example. 360° video, sometimes referred to as an immersive or spherical video, is a video recording where a view is acquired in every direction at the same time. When a 360° video is viewed by a user, the viewer has control of the viewing direction like a panorama. It should be appreciated that a 360° video is different than virtual reality in that the view of the 360° video is anchored to the point of view of the videographer, whereas in virtual reality the view is free to move within the defined space.

In an embodiment, the operator selects a plane (i.e. surface) and an attachment point within the point cloud. A preview image (such as but not limited to a single image, a two-dimensional video or an icon) of the 360° video content is projected onto the plane and may be oriented towards the user's point of view. In another embodiment, the preview image has a fixed orientation. In an embodiment, the 360° video content is played in an external player on the virtual reality device when the preview picture is selected. In an embodiment, the audio or sound content is indicated by a graphical element, such as an icon and is played when the user selects the graphical element.

The sound media 137 may be placed within the point cloud and represented as a graphical image or an icon 162. The sound media 137 representation is similar to a two-dimensional image that includes a computer addressable link to a sound file. To place the sound media 137, the operator selects a point on a surface such as on surface 150 and associates or attaches the graphical image 162 to the selected point. In an embodiment, the sound media may be played when selected or automatically without any selection. When being played the audio the sound provided to the user may be based on the location and orientation of the user in the virtual reality environment. User being far away from the audio source perceives the audio silently, whereas being nearer perceives it more loudly. This provides advantages in allowing the location and orientation based sound media to provide the user with a more immersive experience.

With the user-defined content placed within and integrated with the point data, the method 110 proceeds to block 118 where the point cloud is converted into a virtual reality format that is compatible with the virtual reality device that the information will be displayed. In an embodiment, all of the user-define content elements (e.g. images, videos and texts) are stored with an assignment to a specific location and orientation within the point cloud data. In some embodiments, the virtual reality data file may be a file format such as Virtual Reality Modeling Language or VRML (ISO/IEC 14772-1:1997) or X3D (ISO/IEC 19775-1) that cooperates with a viewer application for display on the virtual reality device It should be appreciated that in some embodiments, it may be desirable for an operator (e.g. the creator of the point cloud data) to provide a single integrated installable binary executable file in block 120. In this embodiment, the virtual reality data file is an executable file includes a viewer program that is compatible with the desired virtual reality device and datasets based on the point cloud data.

With the virtual reality data file created, the method 110 then proceeds to block 122 where the file is transmitted to the user for use with the virtual reality device. When viewed in a virtual reality device, the user will see in the display a representation of the environment 100 as shown in FIG. 9. It should be appreciated that the user will not see defined edges within the display, but the environment 100 will appear as one continuous space. In addition to the surfaces of the environment 100, such as surface 150 for example, that are defined by the point cloud generated by scanning the environment 100 with a coordinate measurement device 20, the user will also see the user-defined content, such as text 142, logo 144, image 152 and sound icon 162. As the user "moves" through the virtual space representing the environment 100, additional user-defined content will come into view in the virtual reality device when the user viewpoint 146 is positioned in a location that the user-defined content has been attached may be seen.

Figure 10:
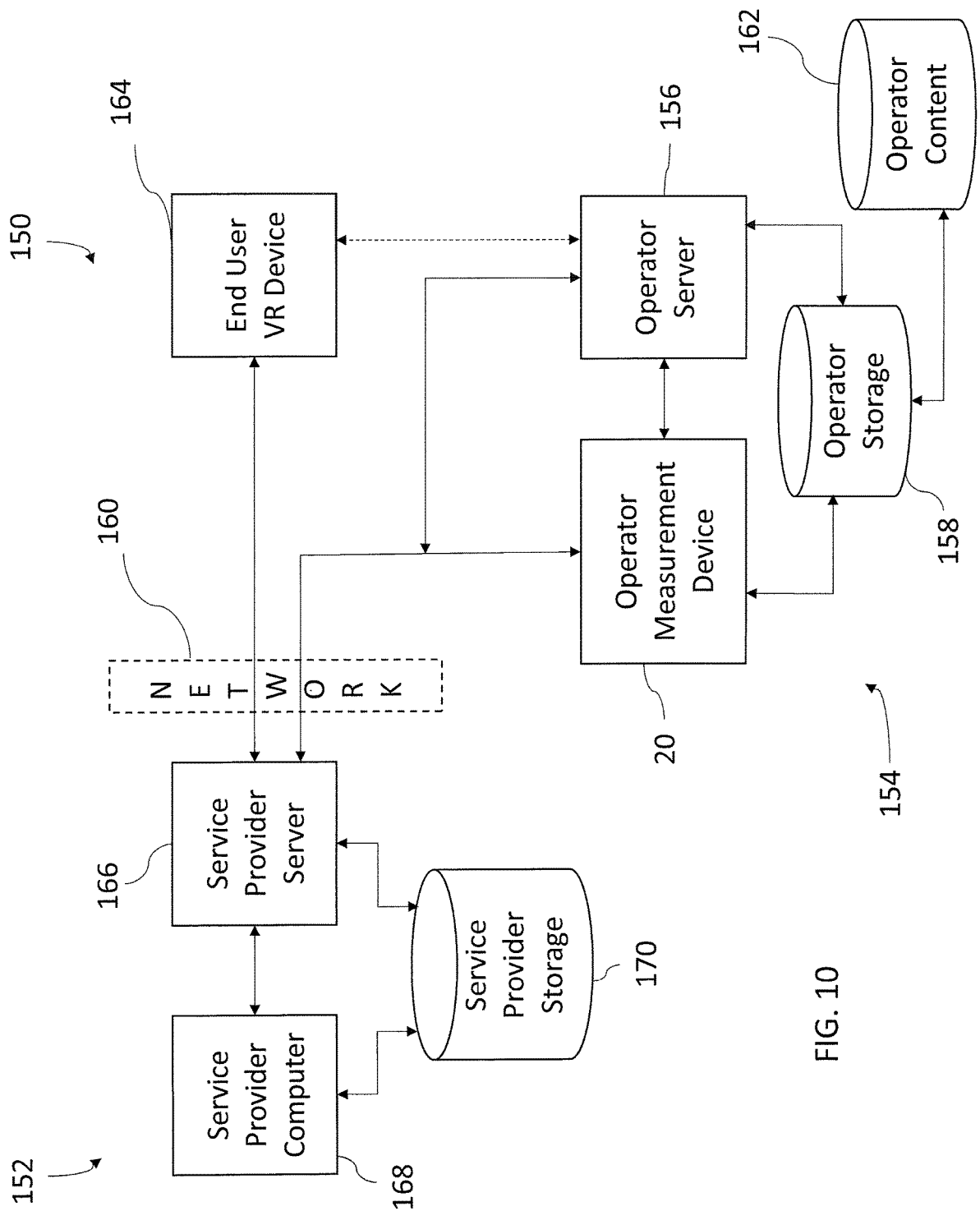
FIG. 10 illustrates a block diagram of a system for providing virtual reality data files based on point cloud data.

Referring now to FIG. 10, an embodiment is shown of a system 150 for creating and distributing virtual reality data files that are based on point cloud data generated by a coordinate measurement device. In some embodiments, the creator of the point cloud data (referred to herein as the operator) may be different or located in a different location than a user who views the scanned environment with the virtual reality device. For example, the user may be a customer of the operator, such as an architect or a builder for example, who has hired the operator to scan an environment. Further, it may be desirable to use a service, such as a service provider system 152 for example, that processes the point cloud data acquired by the coordinate measurement device and generates the virtual reality data file for the user.

In the system 150, the operator system 154 includes the coordinate measurement device 20 that is coupled to communicate with an operator service 156 or an operator storage device 158. In some embodiments, the one or more of the coordinate measurement device 20 or the operator server 156 are coupled to communicate with the service provider 152, such as via a communications network 160 or the Internet for example. The operator storage device 158 may include or be coupled to communicate with an operator content storage device 162. The content storage device 162 stores the user-defined content that may be used in cooperation with the point cloud data to define the content of the virtual reality environment displayed on the user's virtual reality device 164.

In an embodiment, the operator server 156 functions as a database server organized to collect the scan data and user-defined content. The operator server 156 may also provide data services to other devices, such as coordinate measurement device 20 or other computers, in a client-server model framework. For example, in an embodiment the operator server 156 may generate the point cloud data based on three-dimensional coordinates as described herein. In an embodiment, the operator server may be a web server that delivers and transmits web-based content.

In an embodiment, the service provider system 152 may include a service provider server 166 that is connected to communicate with the operator system 154 via the network 160. The system 152 may further include a service provider computer 168 that is adapted to provide on-location access to the service provider server 166 for administering and configuring the computer. From this access, the administrator may configure settings, such as security of the server 166, allow access to server 166. From the service provider computer 168, the administrator may also configure the access to server 166 on a subscription basis, meaning the one or more of the operator or the user have subscribed and paid associated fees for communicating with the service provider system 152.

The service provider system may further include service provider storage 170 that is coupled to both the server 166 and the service provider computer 168 for storing content, such as but not limited to the point cloud data, user-defined content, and the virtual reality data files.

The service provider server 166 and the operator server 156 may include any kind of processor, processing unit or controller having the capability to receive and transmit data to one or more electronic communication devices positioned at various remote locations, on a continuous, periodic or aperiodic basis that is sufficient for providing the desired services. In an embodiment, the servers 156, 166 may also include memory with error detection and correction and redundant disks to ensure reliable communication of data.

The service provider server 166 includes software executing methods thereon, which provides a web page allowing a subscriber to log in to the service provider server. The software provides a plurality of services to the subscriber. It should be appreciated that the subscriber may be the operator, the user or a combination of the foregoing. The subscriber is able to select from among the service to generate a virtual reality data file, save the generated virtual reality data file on the service provider storage 170, and transmit the virtual reality data file to the virtual reality device 164. In an embodiment, the methods executed by the software include a check to make sure the subscribers account is valid or active (e.g. paid a subscription fee) before the services are provided by the server 166.

In some embodiments, the software executes methods that provide for the operator to establish a sequential order in which certain virtual reality data files are presented to the user. The operator may further configure time limits for access to each virtual reality data file.

In an embodiment, the methods of FIG. 5 and FIG. 6 are carried out using the system 150.

It is understood in advance that although this disclosure describes the network 160 in reference to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. In essence, cloud computing is an infrastructure comprising a network of interconnected nodes.

Figure 11:
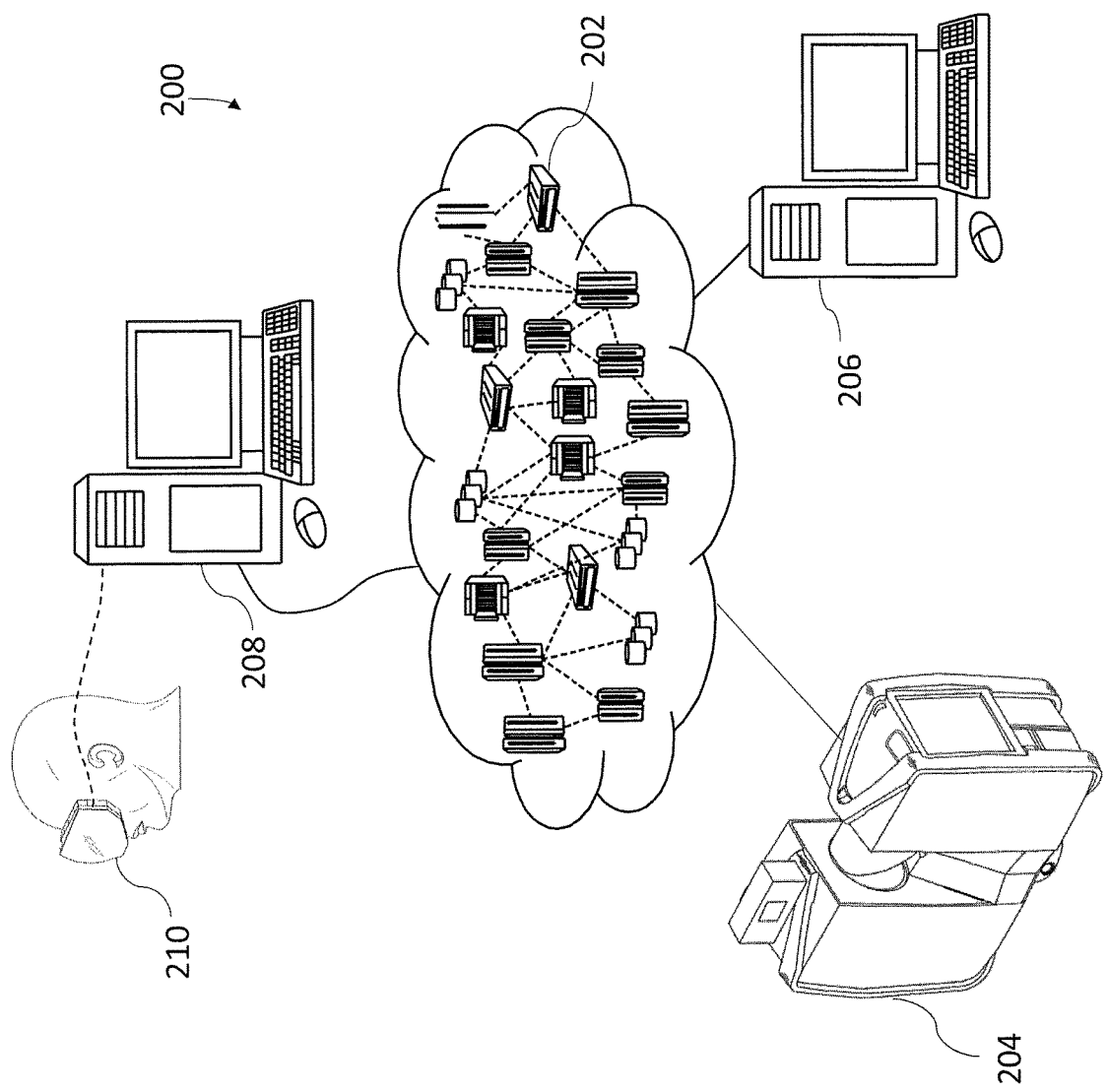
FIG. 11 illustrates a cloud computing environment in accordance with an embodiment.

Referring now to FIG. 11, illustrative cloud computing environment 200 is depicted. As shown, cloud computing environment 200 comprises one or more cloud computing nodes 202 with which local computing devices used by cloud consumers, such as, for example, coordinate measurement device 204, a computer 206, and a computer 208 connected to a virtual reality device 210 may communicate. Nodes 202 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 204-210 shown in FIG. 11 are intended to be illustrative only and that computing nodes 202 and cloud computing environment 200 can communicate with any type of computerized device over any type of network and/or network addressable connection (e.g., using a web browser).

Figure 12:
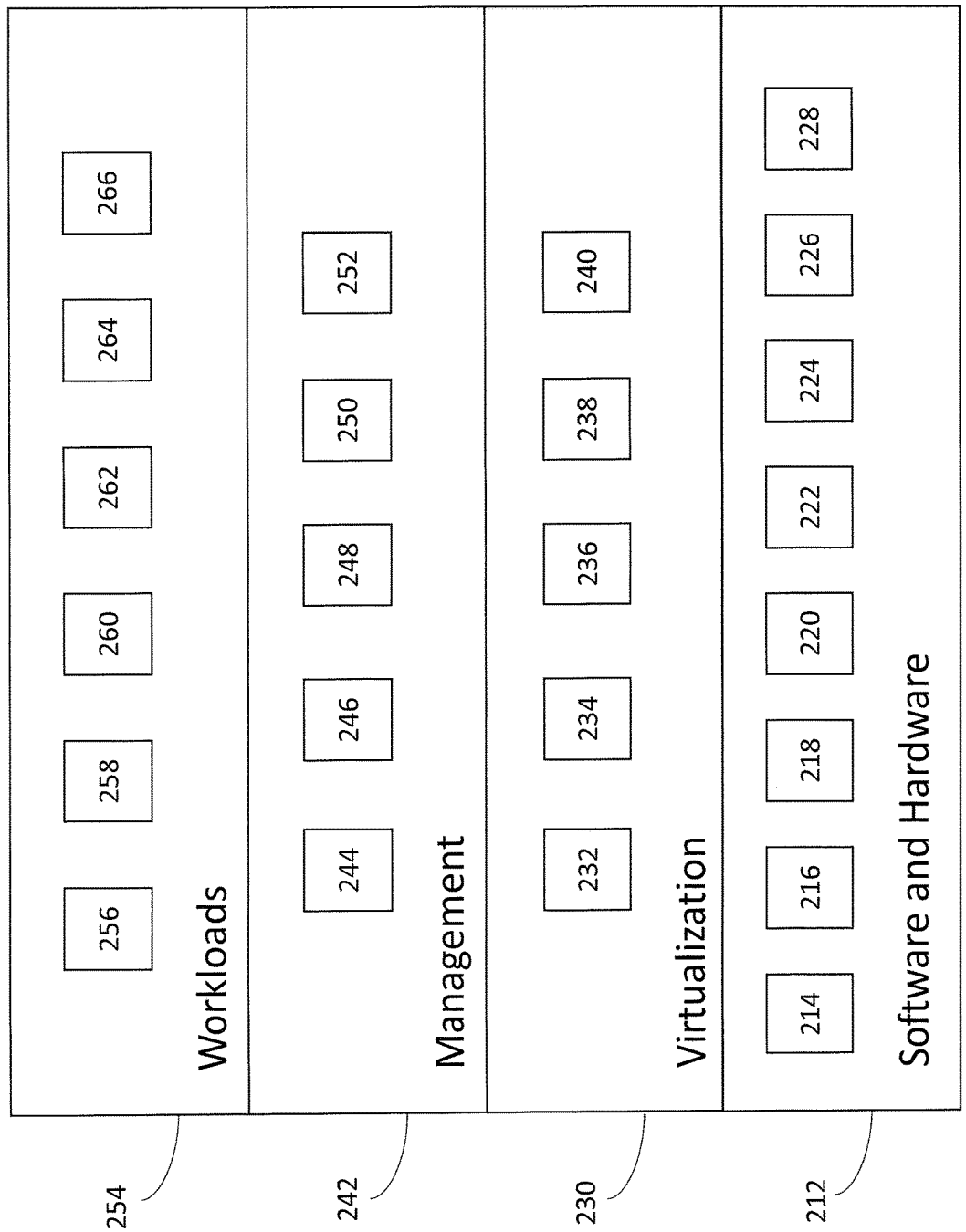
FIG. 12 illustrates an abstraction model layers in accordance with an embodiment.

Referring now to FIG. 12, a set of functional abstraction layers provided by cloud computing environment 200 (FIG. 11) is shown. It should be understood in advance that the components, layers, and functions shown in FIG. 12 are intended to be illustrative only and embodiments of the invention are not limited thereto. As depicted, the following layers and corresponding functions are provided: Hardware and software layer 212 includes hardware and software components. Examples of hardware components include: mainframes 214; RISC (Reduced Instruction Set Computer) architecture based servers 216; servers 218; blade servers 220; storage devices 222; and networks and networking components 224. In some embodiments, software components include network application server software 226 and database software 228; Virtualization layer 230 provides an abstraction layer from which the following examples of virtual entities may be provided: virtual servers 232; virtual storage 234; virtual networks 236, including virtual private networks; virtual applications and operating systems 238; and virtual clients 240.

In one example, management layer 242 may provide the functions described below. Resource provisioning 244 provides dynamic procurement of computing resources and other resources that are utilized to perform tasks within the cloud computing environment. Metering and Pricing 246 provide cost tracking as resources are utilized within the cloud computing environment, and billing or invoicing for consumption of these resources. In one example, these resources may comprise application software licenses. Another example includes management of subscriptions to the service provider system 152. Security provides identity verification for cloud consumers and tasks, as well as protection for data and other resources. User portal 248 provides access to the cloud computing environment for consumers and system administrators. Service level management 250 provides cloud computing resource allocation and management such that required service levels are met. Service Level Agreement (SLA) planning and fulfillment 252 provide pre-arrangement for, and procurement of, cloud computing resources for which a future requirement is anticipated in accordance with an SLA.

Workloads layer 254 provides examples of functionality for which the cloud computing environment may be utilized. Examples of workloads and functions which may be provided from this layer include: mapping and navigation 256; software development and lifecycle management 258; transaction processing 260; point cloud to virtual reality data processing 264; user defined content to point cloud processing 266; and virtual reality data file generation and delivery processing 268.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of viewing point cloud data with user defined content in a virtual reality device, the method comprising:
    measuring three-dimensional coordinate data by scanning an environment using a coordinate measurement device;
    generating a point cloud data based at least in part on the three-dimensional coordinate data;
    selecting a user defined content;
    selecting an area in the point cloud data for the user defined content;
    inserting the user defined content into the area of the point cloud data;
    generating a virtual reality data file from the point cloud data with the user defined content;

associating the virtual reality data file with an authorization information to set access to the virtual reality data file, wherein the authorization information is received from a subscriber, and wherein the subscriber is distinct from a user that is authorized to view the virtual reality data file via the virtual reality device; and transmitting the virtual reality data file to the virtual reality device, wherein the virtual reality data file is accessible in response to receipt of user credentials that match the authorization information.

2. The method of claim 1, wherein the user defined content is selected from a group comprising: two-dimensional images; network addresses, text, three-dimensional models, a computer aided design model, video images, animations, web pages, streaming media data and combinations thereof.

3. The method of claim 1, further comprising receiving the user defined content prior to selecting the user defined content.

4. The method of claim 1, wherein the authorization information is associated with the virtual reality data file in response to receipt of an electronic payment from the subscriber.

5. The method of claim 4, further comprising determining that the electronic payment was received prior to transmitting the virtual reality data file to the user.

6. The method of claim 1, further comprising, providing an interface for the user to log in via the virtual reality device.

7. A system for viewing point cloud data with user defined content, the system comprising:
  a coordinate measurement device operable to measure three-dimensional coordinates;
  a computing device having a processor operably coupled to the coordinate measurement device; and
  a virtual reality device operably coupled to the computing device, the virtual reality device being operable to display the virtual reality data file to a user;

wherein, the processor of the computing device is operable to:
  generate a point cloud data and insert user defined content into the point cloud data in response to an input from the user;
  generate a virtual reality data file based at least in part on the point cloud data with the user defined content;
  associate authorization information to set access to the virtual reality data file by the user, wherein the authorization information is received from a subscriber, the authorization information is associated with the virtual reality data file in response to receipt of an electronic payment from the subscriber, and wherein the subscriber is distinct from a user that is authorized to view the virtual reality data file via the virtual reality device; and
  transmit the virtual reality data file to a virtual reality device, wherein the virtual reality data file is accessible via the virtual reality device in response to receipt of user credentials that match the authorization information.

8. The system of claim 7, wherein the user defined content is selected from a group comprising: two-dimensional images; network addresses, text, three-dimensional models, a computer aided design model, video images, animations, web pages, streaming media data and combinations thereof.

9. The system of claim 7, wherein the processor is further responsive to inserting the user defined content in an area of the point cloud based on a second input from the user.

10. The system of claim 7, the user defined content is received prior to selecting the user defined content.

11. The system of claim 7, wherein the processor of the computing device is further operable to provide an interface for the user to log in via the virtual reality device using the user credentials.

* * * * *